| United States Patent Office | 3,362,260 |
|---|---|
| | Patented Jan. 9, 1968 |

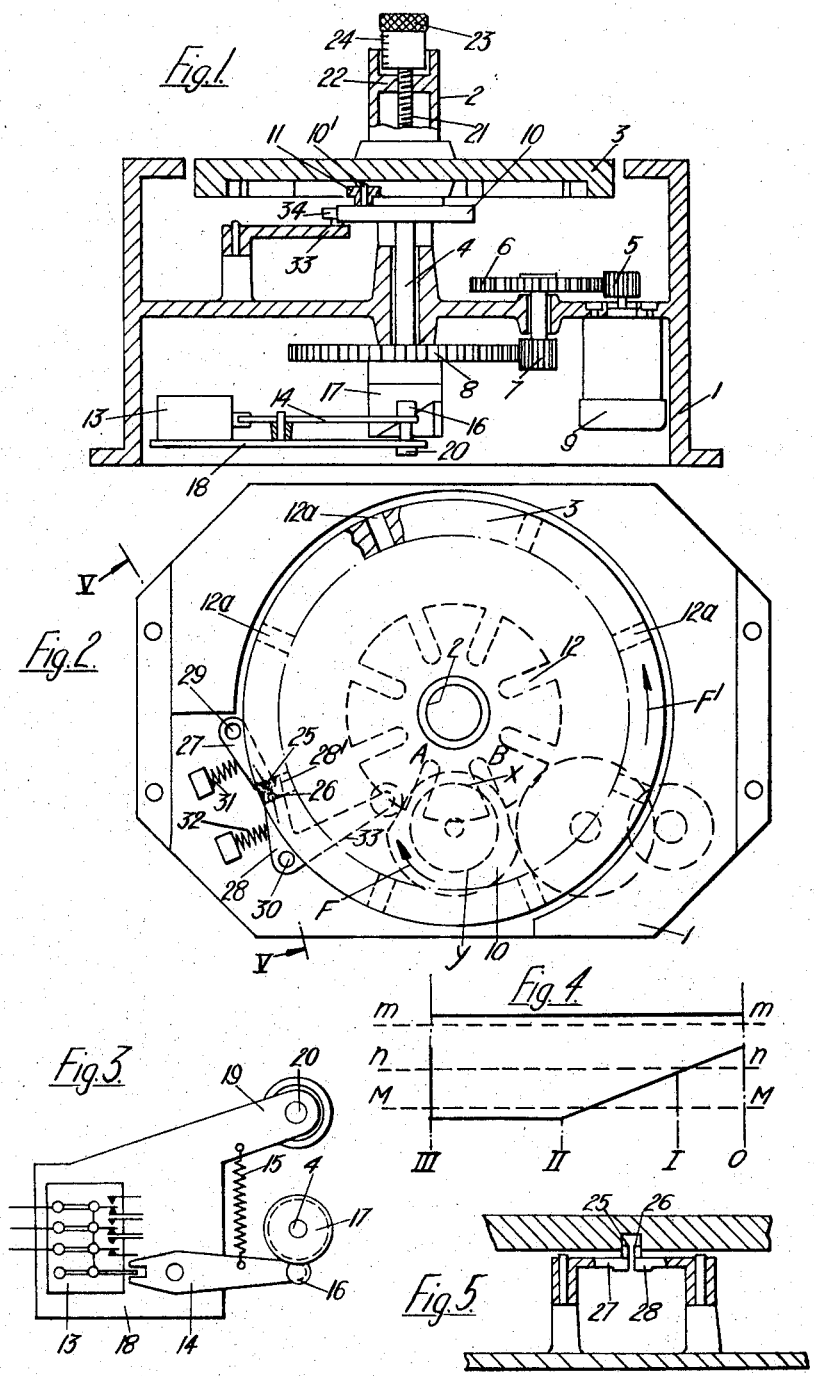
Jan. 9, 1968     G. CAMARDELLA     3,362,260
DEVICE FOR CONTROLLING THE AUTOMATIC INTERMITTENT
ADVANCEMENT OF WORKING TABLES
Filed April 12, 1965
INVENTOR
Giuseppe Camardella
BY
Stevns, Davis, Miller & Mosher
ATTORNEYS

3,362,260
DEVICE FOR CONTROLLING THE AUTOMATIC INTERMITTENT ADVANCEMENT OF WORKING TABLES
Giuseppe Camardella, Via M. Bernina 8, Bollate, Milan, Italy
Filed Apr. 12, 1965, Ser. No. 447,268
Claims priority, application Italy, Apr. 11, 1964, 7,915/64
11 Claims. (Cl. 74—820)

With the expansion in industry of the mass production of various products, different handling systems to shift the product from a working station to another have developed.

As it is well known, the handling job can be carried out either by rollers, loose carriages, carpets, linked carriages, or rotary tables, which means are driven by motor systems.

The driving can be either of the continuous or intermittent type. In the former case minor dynamic and kinematic problems are encountered, and the advancement speed has to be adjusted to the working rate of the operators. In the latter case, although it is on the one hand a bit more complicated, there is the advantage of stopping the product for the working time of the operator and the operating machines, and the adaptation to the working rate is obtained by varying the dwell time endurance, but not the handling time, which should be in any case the shortest time, dictated by the product involved.

To this end, in the latter case there is provided a driving system which is intermittently actuated for the short advancement time intervals, and then disconnected during the working phase. Intermittent feed control devices used heretofore are however, as mentioned, relatively complicated means, since, when it is desired to provide for an easy adjustment of the dwell times, independently of the constant advancement time, they involve electrical and/or electronic devices, time-delay relays, and the like for the driving system control.

The above-outlined inconveniences are overcome by the device according to the present invention, which provides a simple and economically convenient intermittent advancement system with continuous and accurate adjustment of the dwell time, independently of the advancement time. Said device is of the type in which the advancement of work transporting means is controlled through Maltese cross means and characterized by the fact that for the rotary pin of the Maltese cross, which engages on the grooves of the working table to operate the advancement thereof, there is provided a dual speed control, the higher speed being used for at least the entire run of the pin in engagement on said grooves and the lower speed being used for an adjustable section of the run which said pin accomplishes in disengagement from said grooves.

It is another object of the present invention to provide a locking device for the advancing work transporting means which, besides permitting the centering of said means, obtains an actual and uniform take up of the plays caused by wear.

These and still other objects of the invention will become more apparent from the following detailed description of a preferred non-limiting embodiment form of an eight-working-station rotary table when taken in conjunction with the accompanying drawings, in which:

FIG. 1 is a schematic vertical section of a rotary table according to this invention;

FIG. 2 is a plan view of the same rotary table with parts in section;

FIG. 3 is a plan view of the electrical cam switch;

FIG. 4 is the development in plane of the cam of the electrical switch in FIG. 3, and FIG. 5 is a vertical section of the locking device of the rotary table along the line V—V in FIG. 2.

The rotary table according to the present invention comprises a frame 1 to the center part of which is fastened the hollow shaft 2, on which is mounted, freely rotatable, the rotary table 3. A secondary shaft 4 is set in motion via the reduction gears 5, 6, 7 and 8 by a motor 9; the latter being preferably a two speed type electric induction three phase motor. In a preferred embodiment, the motor can rotate by switching of wires to 2700 and 310 r.p.m., respectively.

With the upper end of the shaft 4 is associated a cam 10 from the periphery of which projects upwardly a pin 10' acting as support for the roller 11. The latter is freely rotatable on the pin 10' and controls, upon rotation of the cam 10, the advancement of the rotary table 3 by the well-known Maltese cross system, the rotary table having on its lower face radial grooves 12 inside which the roller 11 can slide by engaging one of the side flanks thereof.

The axis of the roller 11 moves over the entire circumference indicated by $x$–$y$ in response to rotation of cam 10 in the direction indicated by arrow F in FIG. 2. The arrangement is such that the circumference $x$–$y$ is, at the points corresponding to the mouth of the grooves 12, exactly tangent relative to both median axes of two contiguous grooves 12 (FIG. 2). In this manner, when the roller 11 rotates together with the cam 10 according to the arrow F, it enters a groove, e.g. in the position A, and by rotating imparts to the same, and hence also to the rotary table 3, an advancement according to the arrow F'.

This advancement continues until the roller 11 moves out from the groove in response to the groove being displaced to the exact position of the preceding groove, in position B. Obviously, the rotary table 3 moves forward in direction of the arrow F' only during the time period in which the roller 11 engages a groove 12, which corresponds to movement of roller 11 along the arc indicated by $x$, while it remains still during the time in which the roller 11 moves over arc indicated by $y$. A stepwise advancement of the rotary table 3 is thus attained, each step involving an advancement corresponding to the distance of two contiguous grooves, and each turn of the rotary table being made in a number of steps corresponding to the number of the grooves in the rotary table.

It should be noted that if motor 9, and therefore roller 11, rotates at a constant speed, the advancement time and dwell time of the rotary table are directly proportional to the widths of both arcs $x$ and $y$, respectively.

According to the present invention it is possible to adjustably increase the dwell time of the rotary table independently of the advancement time. This is attained, as mentioned, due to the fact that the motor 9, while moving over the arc $x$, rotates at its higher speed, and can be switched to its lower speed while moving over the arc $y$, thereby increasing the time taken by the roller 11 to run the arc $y$, or the dwell time.

The speed variation of the motor 9 is obtained via the electrical switch 13, which is actuated by one end of a lever 14. By the effect of a spring 15, the other end of the lever 14, which carries a cam following roller 16, is kept in contact with the cam 17.

The cam 17, which rotates fast with the shaft 4, is obtained from a cylindrical surface coaxial to said shaft 4, its development being shown in FIG. 4. The relative position between the roller 16 and the cam 17 can be modified to the effect that the roller may follow on the cam 17 a rectilinear track comprised between the tracks indicated by m—m and M—M in FIG. 4. It is to be noted that in the case of the track m—m the roller 16 is constantly resting upon the cylindrical surface of the cam 17, in which position the switch 13 is never actuated. In this instance the motor 9, and hence the roller 11, always rotates at the higher speed and the dwell time is reduced to the minimum. The zone of the cam 17 comprised between the point II and the point III corresponds to the arc x traveled by the pin 10′, and in which there should be no switching, while the arc y corresponds to the zone comprised between the point 0 and the point II in which a switching is feasible. For example, in running a track n—n there will be switching to the lower speed at the point 0 of the cam, and subsequently switching to the higher speed at the point I. The section comprised between the point 0 and the point I, corresponds to a recessed zone of the cylindrical surface of the cam 17 and to a proportional section of the arc y starting from the position of the roller 11 when it leaves the slot 12, that is position B. It is obvious that by varying the relative position of the cam follower 16 and the cam 17 in the zone comprised between the tracks m—m and M—M the width of the zone 0–I varies and hence the time during which the motor rotates at the lower speed.

The displacement of the cam follower 16 relative to the cam 17 is obtained through the plate 18, which carries the roller 16, and lever 14, switch 13, and an arm 19. The end of the arm 19 is controlled by the lower end 20 of a threaded rod 21 which passes through the hollow shaft 2 up to its upper end. The connection between the rod 21 and the arm 19 is carried out in such a way that the plate 18 follows the vertical movements of the rod 21, but not its rotation. The rod 21 has, at its upper end, a threading screwing into a nut screw 22 integral with the shaft 2.

A control knob 23, integral with the threaded rod, has a graduation 24 which can be read with respect to the edge of the hollow shaft 2, and gives an indication of the position of the roller 16 relative to the cam 17.

A different embodiment of the cam 17 (not shown in the accompanying drawings) can be obtained by coaxial association of two discs with cam sections, with the modification of their mutual angular position. This gives at least a partial overlapping of the respective profiles, that is to say, a variation of the overall peripheral profile. In such a case the cam follower 16 and hence the plate 18 can be maintained axially fixed, and the shaft 2 need not be hollow. The control of the cam and cam follower assembly can be provided by an appropriate transmission located, for example, on the side of the frame 1.

The present invention also provides, as mentioned, a rotary table positioning and locking device, which operates at the end of each advancement step of the rotary table itself. Said device comprises a pair of dowels 25 and 26 carried by the end of both arms 27 and 28, which are pivoted on stationary pins 29 and 30, respectively. The dowels 25 and 26 are pressed, by the action of the springs 31 and 32 acting upon the arms 27 and 28, into the extensions 12a of the grooves 12 thus locking the rotary table 3.

This locking arrangement is definitely ensured by the fact that the angle formed between the plane lying along the axes, for example of the pin 30 and dowel 26, and the normal to the surface of the flank of the groove 12a, is extremely narrow and the force of the springs 31 and 32 is more than adequate to overcome the reaction component which would result from a tangential thrust on the rotary table 3 tending to move outwardly the dowels 25 and 26.

One of two arms 27 or 28—in the example illustrated the arm 28—extends into a second arm 33 at the end of which is mounted for rotation a roller 34. The latter is in contact with the section of the disc 10 having a cam-like shape. The cam-like profile of the disc 10 acts upon the roller 34 so as to rotate the arm 28 at the proper moment when the advancement of the rotary table 3 starts and to thus disengage the dowel 26 from the groove 12a. The end of the arm 28 carries an extension piece 28′ which is in contact with the end of the arm 27 so that, when the end of the arm 28 is moved outwardly, the end of the arm 27 is also pushed outwardly thus ensuring the simultaneous release of the dowels 25 and 26 from the groove 12a.

As it can be easily seen any play which may result from wear of both pins 29 and 30, and dowels 25 and 26, are automatically taken up by the wedge-effect produced by the dowels 25 and 26 themselves on the walls of the groove 12a.

It is understood that many changes could be made in the above construction and many apparently widely-different embodiments of this invention could be made as, for example, with respect to the shifting system of the cam following roller 16 relative to the cam 17 or the entire control system of the motor speed, and modifications could be introduced without departing from the scope of the inventive concept as defined in the appended claims.

What I claim is:

1. A device for controlling the automatic intermittent advancement of a working table utilizing a Maltese cross drive means in which a driving member is adapted to move in an endless path and engage said table during one portion of said movement to advance the table, wherein the improvement comprises a multi-speed motor; connecting means operatively connecting said motor and said driving member to effect said movement; control means adjustably responsive to the position of said driving member in said path and adapted to control the speed of said motor accordingly; locking means adapted to engage said table to lock same, and release means responsive to the position of said driving means, and adapted to release said locking means during said portion of the movement of said driving member.

2. The improvement of claim 1, wherein said driving member is in the form of a pin moving in a circular path, and wherein grooves are formed in said table, said pins engaging said grooves to advance the table.

3. The improvement of claim 1, wherein said control means is adapted to control the speed of said motor during another portion of the movement of said driving member in which said table is not advanced.

4. The improvement of claim 1, wherein said means operatively connecting said motor and said driving member comprises a shaft, a carrier member mounted on said shaft and adapted to carry said driving member, and a gear mechanism for operatively connecting said motor to said shaft, for rotating said shaft.

5. The improvement of claim 4, wherein said control means comprises a cam member carried by said shaft; a cam follower, one end of which engages said cam; and switching means connected to said motor for controlling the speed thereof, the other end of said cam follower adapted to engage said switching means to actuate same.

6. The improvement of claim 5, wherein said cam member has a three-dimensional varying surface and further comprises means for adjusting said cam member with respect to said cam follower so that the speed of said motor may be controlled in response to said driving means attaining varying positions in said path.

7. The improvement of claim 6, wherein said cam member is in the form of a circular cylinder arranged on said shaft so as to rotate about its axis, the surface of said cylinder having a recessed zone starting from one cylinder base and limited by two converging edges, each developed helically according to a generatrix.

8. The improvement of claim 4, wherein said locking means comprises at least one bell crank locking lever, one end of which is adapted to engage said table to lock same.

9. The improvement of claim 8, further comprising a wedge member fixed to said end of said lever, said wedge member adapted to wedge into one of a plurality of grooves in said table to lock said table.

10. The improvement of claim 8, wherein said means adapted to release said locking member comprise an additional cam member carried by said shaft, said additional cam member engaging the other end of said bell crank lever and adapted to release said locking member when said driving member engages said table.

11. A device for controlling the automatic intermittent advancement of a working table utilizing a Maltese cross drive means in which a pin is adapted to move in a circular path and engage grooves in said table during one portion of said movement to advance the table wherein the improvement comprises a dual speed motor; a shaft; a carrier member mounted on said shaft and adapted to carry said pin; a gear mechanism for operatively connecting said motor to said shaft for rotating said shaft; a cam member carried by said shaft; a cam follower, one end of which adjustably engages said cam; switching means connected to said motor for controlling the speed thereof, the other end of said cam follower adapted to engage said switching means to actuate same; at least one bell crank locking lever, one end of which is adapted to engage said table to lock same; an additional cam member carried by said shaft, said additional cam member engaging the other end of said bell crank lever and adapted to release said locking member when said pin engages a groove, thereby allowing an automatic adjustable control of the locking time of said table which does not affect the advancement time.

References Cited

UNITED STATES PATENTS 1,748,540  2/1930  Curtis _____ 74—820 X
2,628,413  2/1953  Hallenbeck.

FRED C. MATTERN, JR., *Primary Examiner.*